United States Patent [11] 3,615,652

[72] Inventors: Hovey M. Burgess, Greenwich; Robert W. Mellentin, Westport, both of Conn.
[21] Appl. No. 882,694
[22] Filed Dec. 5, 1969
[45] Patented Oct. 26, 1971
[73] Assignee General Foods Corporation, White Plains, N.Y.
Continuation of application Ser. No. 486,586, Aug. 23, 1965, now Patent No. 3,982,985, Continuation-in-part of application Ser. No. 295,604, July 15, 1963, now Patent No. 3,202,514, Continuation-in-part of application Ser. No. 216,723, Aug. 14, 1962, Continuation-in-part of application Ser. No. 829,510, July 27, 1959. The portion of the term of the patent subsequent to Aug. 24, 1982, has been disclaimed.

[54] METHOD OF MAKING ANIMAL FOOD
2 Claims, No Drawings

[52] U.S. Cl. ..................... 99/7, 99/2, R, 99/107
[51] Int. Cl. ..................... A23k 1/00, A23k 1/10
[50] Field of Search ..................... 99/2, 7, 171, 107

[56] References Cited
UNITED STATES PATENTS

| | | | |
|---|---|---|---|
| 3,115,409 | 12/1963 | Hallinan et al. | 99/7 |
| 3,202,514 | 8/1965 | Burgess et al. | 99/2 |
| 3,482,985 | 12/1969 | Burgess et al. | 99/2 |
| 3,516,838 | 6/1970 | Du Puis | 99/2 |

Primary Examiner—Norman Yudkoff
Assistant Examiner—Curtis P. Ribando
Attorneys—Michael J. Quillinan, Bruno P. Struzzi and Thomas V. Sullivan ABSTRACT: Nutritionally balanced animal food is pasteurized into a stable intermediate moisture product by employing an antimycotic and sugar in amounts sufficient to increase osmotic pressure and thereby stabilize the pasteurized matrix, the matrix being thereafter cooled and shaped into the desired form.

METHOD OF MAKING ANIMAL FOOD

CROSS-REFERENCE TO RELATED APPLICATIONS

This application is a continuation application of U.S. Ser. No. 486,586, filed Aug. 23, 1965, now U.S. Pat. No. 3,982,985, for METHOD OF MAKING ANIMAL FOOD, which latter application was a continuation-in-part of the following prior applications:

| U.S. Serial No. | Filed | Title | Issued |
| --- | --- | --- | --- |
| 295,604 | July 15, 1963 | Animal Food and Method of Making the Same | 3,202,514 |
| 216,723 | Aug. 14, 1962 | do | Abandoned |
| 829,510 | July 27, 1959 | do | Abandoned |

BACKGROUND OF THE INVENTION

This invention relates to a novel food for carnivorous animals and to a method of making the same. More specifically, it relates to a novel dog food particularly characterized by high nutritional value and extended storage life.

As is well-known to those skilled in the art, animal foods, and particularly dog foods, are commonly prepared for the consumer in two forms: the meal type particularly characterized by its dry more-or-less cereallike texture and by its low moisture content, typically about 10 percent; and the canned type particularly characterized by its more-or-less meatlike texture and by its high moisture content, typically as high as 75 percent.

The meal-type feeds generally have a very high nutritional and caloric value and an extended period of storage life. However, the palatability of most typical dry dog foods is rather low. In many cases, the animals will not eat them in dry form, and it is usually necessary to add liquids thereto. When this is done, the mixture commonly becomes mushy or doughy and generally unsatisfactory to the dog with the result that it is not eaten if there be other foods available.

Canned-type dog foods, on the other hand, are generally received very favorably by dogs—they possess a very high degree of palatability. However, the storage characteristics of these products is such that they require packing and storing in sealed cans which creates a considerable portion of the cost. Further, once a can is opened, it must be quickly consumed, or it deteriorates unless stored under refrigeration.

SUMMARY OF THE INVENTION

It is an object of this invention to prepare a novel-type animal food characterized by a very high palatability, a long shelf life when stored under nonrefrigerated conditions, and a high nutritional content. Other objects will be apparent to those skilled in the art on inspection of the following description.

In accordance with certain of its aspects, the animal food of this invention, characterized by high palatability, high nutritional content, and extended shelf life is formulated by a process which comprises formulating a mixture of pasteurized meat, water in amounts sufficient to impart plasticity to the product, soluble solids in amount greater than the bacteriostatic amount and a water absorbent. Formulation of a complete product preferably also includes incorporation thereinto of a protein balancing agent to provide a balanced selection of proteins; an antimycotic to minimize growth of mold or fungi; and desired additional materials to modify or impart flavor, color, mineral content, vitamins, etc.

DESCRIPTION OF THE PREFERRED EMBODIMENT

The meat which may be used in formation of this novel product includes any desired cut of meat, including meat byproducts and variety meats, as well as and poultry byproducts or fish and fish byproducts. Commonly the meat component, which contributes much of the flavor appeal and palatability of the product, will be beef, e.g., beef tripe, trimmings, etc. In the preferred embodiment, the meat content may be as much as, e.g., 35 percent of the total weight of the product. Commonly it may be 25–35 percent and in a typical product, it may, for example, be 30–32 percent.

The meat content of the product will form a matrix with which the other components of the product will be combined. The raw material meat may be in any desired form, but when it has been processed, as hereinafter described, it may be in finely divided particulate form or more preferably in more-or-less liquid form.

The water content of the product may be sufficient to impart plasticity, i.e., to permit the product to be readily formed, mixed, pressed, molded, etc. Preferably the water content will be as low as 16–17 percent or as high as 26–27 percent. Most desirably it will be maintained more-or-less fixedly at about 25 percent. A water content substantially above this preferred range makes the product too mushy and nonhandleable, and cuts down considerably on shelf life, while lower moisture contents do not permit attainment of desired plasticity. The water content of the product may be provided by added water, but more commonly it will be obtained from the components of the mixture, typically the meat, which may contain 70 percent moisture or the sugar which may contain, e.g., 10 percent moisture.

The soluble solids which may be used in practice of this invention may preferably include any of the common sugars which are soluble in the aqueous phase of the product in amount sufficient to impart thereto a bacteriostatic action. Commonly those preferred soluble solids, e.g., sugars may have a solubility in water to the extent that they provide a concentration at the levels used to produce the desired bacteriostatic effect. The sugars may include mono- and disaccharides, typically dextrose or sucrose. The sugar will be present at least in bacteriostatic amount. Commonly the desired product will contain 20–35 percent sugar, although higher levels may be used.

The novel product of this invention, when prepared in manner hereinafter disclosed, is characterized by its substantially complete resistance to bacterial decomposition. However, because of its high nutritive content, it may serve as a desirable host for fungi, yeasts, or mold. Accordingly the preferred embodiment of this invention includes an antimycotic agent to minimize fungi or mold growth. Although sorbic acid may be so employed, it is preferred to use potassium sorbate or other sorbate salt. Preferred amount of antimycotic agent may vary but typically it may be about 0.5 percent of the total weight. Other antimycotic agents will be apparent to those skilled in the art. Antimycotics which can be used are benzoic acid, sodium benzoates, proprionic acid, sodium and calcium proprionate, sorbic acid, potassium and calcium sorbate, propylene glycol, diethyl pyrocarbonate, menadione sodium bisulfite (vitamin K).

In the preferred embodiment of this invention, the desired product includes a vegetable protein concentrate, in addition to the meat, sugar, and water mixture. This concentrate raises the total protein level of the mixture to the desired nutritive level while simultaneously contributing to the water adsorbent properties and to the appearance of the product. Vegetable protein concentrates which may be employed (as the term is used herein) include oil seeds and legumes. Typical vegetable protein concentrates include soy flakes (the preferred concentrate), as well as concentrates derived from cottonseed, peanuts, flaxseed, beans, etc.

The preferred vegetable protein concentrate is soy flakes. These materials in addition to their contribution to the nutritional content of the product and to its water adsorptive and plastic properties, may also provide a desirable appearance by forming in the product whitish fatlike spots which (when viewed with the predominantly red body of other material)

produces an appearance very closely resembling ground beef containing natural fat.

Typically the vegetable protein concentrate may be present in amount of 25–40 percent, say 30 percent. The vegetable protein concentrate may be present in the form of a mixture of flakes and flour, and when this mixture is employed, e.g., it may include 20–30 percent, say 20 percent soy flour and 5–10 percent, say 10 percent soy flakes.

In a preferred embodiment of this invention, a product may contain 25–35 percent, say about 32 percent meat; 20–35 percent, say about 26 percent sugar; 25–40 percent, say about 35 percent vegetable protein concentrate and water in amount of 17–27 percent, say 25 percent. In this embodiment, as elsewhere in this specification, the water content is given in terms of percentage of the total wet weight of the product. More specifically, 100 percent product weight is obtained from the, e.g., charge meat; soluble solids, e.g., sugar; and vegetable protein concentrate (each of which contains water) and the percent water is measured in terms of percentage of this total net weight.

The preferred embodiment also includes a protein-balancing agent, typically skim milk solids, which provides a supply of protein sufficient in amount and distribution to raise the level of proteins and to supply those proteins which are not provided by other sources. Use of protein-balancing agents permits attainment of a product having a complete protein required for proper nutrition. Preferably the protein-balancing agent may be present in amount of, e.g., up to about 5 percent.

Other preferred ingredients in the product include: desired flavors including meat fat, salt, etc.; nutrients including vitamins, minerals, etc., and a red dye, preferably F D & C Red #2, to give the desired color. Other appropriate dyes may be employed. The flavor may be present in amount as great as 2–3 percent, and commonly the others, in total, comprise about 1 percent or less.

In practice of one embodiment of this invention, the meat component of the charge may be pasteurized at, e.g., 180°–212° F., say 200° F., for 5 to 15 minutes, say 10 minutes, to kill bacteria and to produce a liquified meat. To this mixture, preferably maintained at about the same temperature, may be added the flavors, nutrients, colors, and antimycotic agent. The vegetable protein may commonly be added to the slurry and the mixture may be maintained at temperature sufficiently high to effect gelatinization of starch, commonly at above 150° F. and typically at 150°–160° F. for 5–10 minutes.

The so-finished mixture, when uniform, may be packaged by wrapping. It is a feature of this invention that the product may be packed in moisture-impermeable wrappers and that no sterilization is required. Preferably, however, the product may be cut into patty form, i.e., cylinders about 3.5 inches in diameter and, e.g., 0.75-inch thick, weighing about 3 ounces.

It is preferred, however, to extrude the finished mixture, at low pressure and at temperature low enough to eliminate stickiness, into small cylinders typically 0.125 to 0.25 inch in diameter, more commonly 0.1875 (i.e., about three-sixteenths) inch and having a length which may range from 0.25 to 1.0 inch, commonly about 0.5 inch. Extrusion may be effected in, e.g., an Enterprise extruder or a Buffalo meat grinder, etc.

The so-extruded cylinders may be molded under low pressure into hamburgerlike patties, typically 3.5 inches in diameter, 0.75 inch in thickness, and weighing about 3 ounces.

The so-prepared product may be characterized by a completely meatlike appearance, color, consistency, texture, and general handleability.

This novel product is particularly characterized by its extended storage life. Under normal ambient conditions, it may be stored indefinitely without any great degree of protection.

A loose moisture-impermeable wrapping is sufficient to protect the product against bacteria and against all common molds or fungi. It needs no refrigeration.

The density of the product will depend on the technique of fabrication including the degree of pressure used to form the patties. Typically the density will be 45–70 pounds per cubic foot and most commonly about 50 pounds per cubic foot for patties. It is apparent that the bulk density of the product may be controlled.

It is particularly significant that the product of this invention is fully as palatable (i.e., as well liked by dogs) as is the best canned dog food—this being far in excess of the generally low palatability of receptiveness of dry foods.

A specific example of the process of this invention may be as follows: A mixture comprising 18.4 pounds of scalded beef tripe, 6.1 pounds of rough tongue gullets, and 6.1 pounds of beef cheek trimmings was placed in a double-jacketed sigma mixer and heated to 212° F. with indirect steam over a period of 10 minutes. To the liquefied meat was added 0.5 pounds of potassium sorbate, 0.2 pound of garlic oil, 2 pounds of tallow, 0.6 pound of salt, 0.25 pound of dicalcium phosphate, 0.6 pound of vitamin premix, 0.001 pound of cobalt sulfate, and 0.005 pound of red dye No. 2. Mixing continued during the addition as the temperature of the mix was maintained at about 200°–212° F.

Untoasted soya flakes (31.5 pounds) were added to the liquid with stirring at temperature of about 180° F. and the resulting thick mixture was stirred for about 5–10 minutes during which time the starch gelatinized to some extent. 25.9 pounds of Frodex (a commercial mixture containing 42 percent dextrose) and 5.1 pounds of dried skim milk were added to the mixture, and subsequently (after about 3–4 minutes at about 200° F.) 3.5 pounds of flaked soybean hulls were added.

The mixture was thoroughly blended and then extruded through a low temperature, low-pressure Enterprise extruder having a round 0.1875-inch diameter nozzle. The extruded cylinder was cut into lengths of about 0.5 inch and the lengths were then formed by low pressure into 3-ounce patties having a diameter of 3.5 inches and a thickness of 0.75 inches.

The so-prepared products had a moisture content of about 25 percent, a protein content of about 22 percent, and a fully balanced measure of other desired nutritional ingredients. It was highly palatable and had an extended storage life in the absence of refrigeration.

Although this invention has been described with reference to specific examples, it will be obvious to those skilled in the art that various modifications may be made thereto which come within the scope of this invention.

What is claimed is:

1. Process for manufacturing a palatable moist animal food comprising proteinaceous meaty matrix material, added sugar solids, and as a water adsorbent a vegetable material which comprises the steps of subjecting said matrix material, an edible antimycotic and said added sugar solids to heat and mixing together with said vegetable material in the presence of 16–17 percent to 26–27 percent water by weight of the mixture for a period of time sufficient to pasteurize the meat to form an aqueous solution of the water soluble solids of said mixture and to disperse said solution uniformly throughout said meaty matrix materials and vegetable materials and hydrate same and thereby form a plastic composition wherein said soluble solids are at a level in solution providing bacteriostatic stabilization, the weight level of said sugar being 20–35 percent and the weight level of said vegetable material being 25–40 percent; and forming said composition into a desired shape.

2. Process according to claim 1 wherein the finished mixture is shaped by extrusion at a lower temperature and the shaped composition is packaged in a loose moisture impermeable wrapper.

* * * * *

PO-1050
(5/69)

UNITED STATES PATENT OFFICE
CERTIFICATE OF CORRECTION

Patent No. 3,615,652   Dated October 26, 1971

Inventor(s) Hovey M. Burgess; Robert W. Mellentin

It is certified that error appears in the above-identified patent and that said Letters Patent are hereby corrected as shown below:

Cover page, line 12, "3,982,985" should be --3,482,985--.
Column 1, line 6, "3,982,985" should be --3,482,985--; line 59, "absorbent" should be --adsorbent--.

Signed and sealed this 23rd day of May 1972.

(SEAL)
Attest:

EDWARD M. FLETCHER, JR.
Attesting Officer

ROBERT GOTTSCHALK
Commissioner of Patents